Dec. 4, 1956 J. V. THOMAS 2,772,573
STROKE MULTIPLIER
Filed Sept. 5, 1952 2 Sheets-Sheet 1
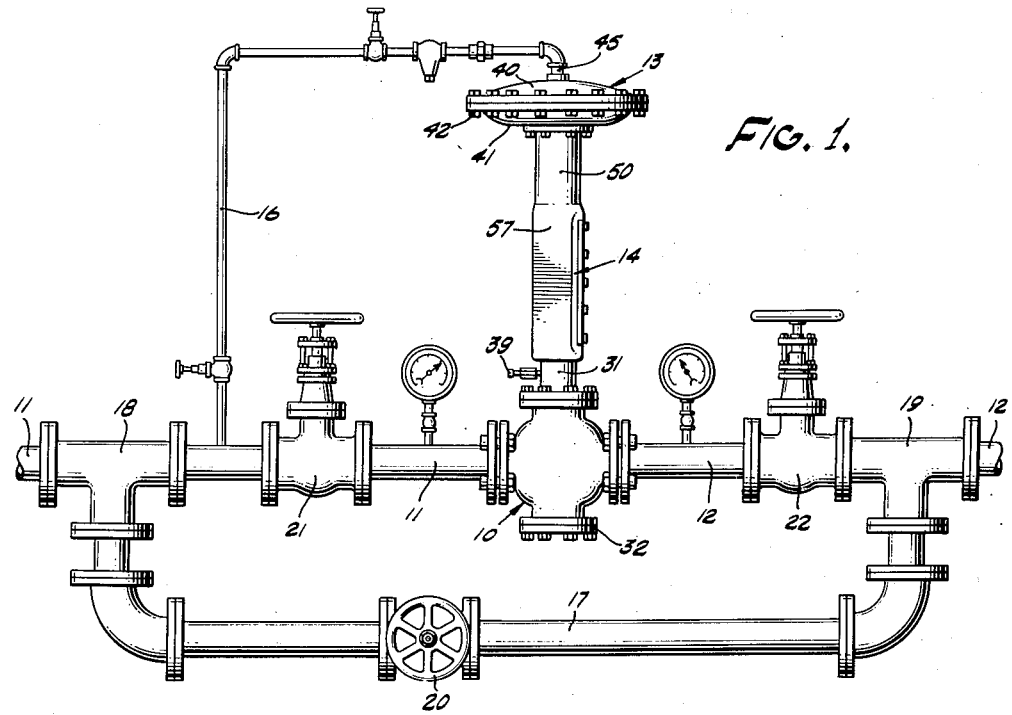
FIG. 1.
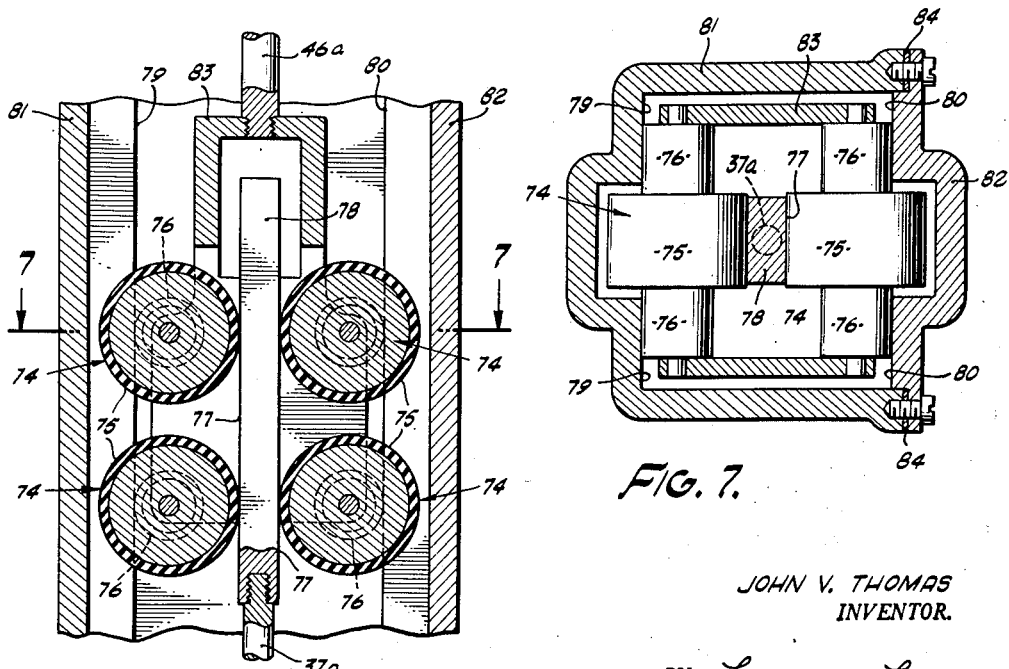
FIG. 6.
FIG. 7.
JOHN V. THOMAS
INVENTOR.
BY Lyon & Lyon
ATTORNEYS Dec. 4, 1956 J. V. THOMAS 2,772,573
STROKE MULTIPLIER
Filed Sept. 5, 1952 2 Sheets-Sheet 2

JOHN. V. THOMAS
INVENTOR.

BY Lyon & Lyon

ATTORNEYS

United States Patent Office 2,772,573
Patented Dec. 4, 1956

2,772,573

STROKE MULTIPLIER

John V. Thomas, Pasadena, Calif.

Application September 5, 1952, Serial No. 307,975

4 Claims. (Cl. 74—110)

This invention relates to flow controlling apparatus as particularly directed to improvements in power operated control valves.

Power operated control valves are commonly employed for regulating fluid pressure in a distribution system. Difficulty is often encountered in connection with such valve assemblies which operate under high pressure. In such devices the overall dimensions of the power head must be held to a minimum in order to withstand the bursting pressures developed by the high pressure fluid. Restricting the size of the power head has the disadvantage of reducing the length of stroke available in devices which employ flexible membranes or diaphragms. For optimum flow regulator characteristics it is desirable to have a long stroke for the movable valve element but the long stroke is not readily obtainable from high pressure power heads.

In accordance with my invention, I provide a stroke multiplying device which is interposed between the power head and the valve assembly and which serves to increase the length of stroke of the valve element. Such a device enables me to employ a high pressure power head of relatively small dimensions and to achieve a relatively long operating stroke for the movable valve element.

Accordingly, it is the principal object of my invention to provide a power operated control valve assembly having a stroke multiplier device interposed between the power head and the control valve.

Another object is to provide a device of this type which is of relatively short overall length and which is relatively simple in design and not apt to get out of working order.

Another object is to provide a stroke multiplier device of this type which may be constructed to give any desired ratio of movement between the driving member and the driven member.

Another object is to provide a power operated valve assembly incorporating a stroke multiplying device to achieve closer pressure regulation.

Another object is to provide a stroke multiplier device of this type, including friction drive mechanism, which is readily adapted for economical manufacture on a quantity basis.

Other and more detailed advantages will appear hereinafter.

Referring to the drawings:

Figure 1 is a side elevation showing a power operated control valve assembly embodying my invention.

Figure 6 is a sectional view similar to Figure 3 showing a modified form of my invention.

Figure 7 is a sectional plan view taken substantially on the lines 7—7 as shown in Figure 6.

Figure 2:
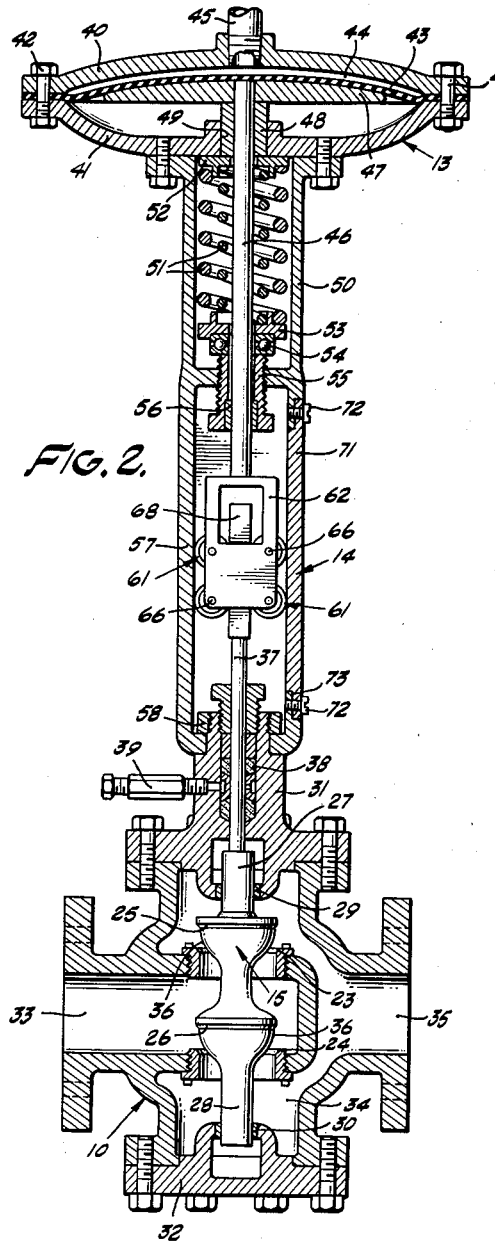
Figure 2 is a sectional elevation showing details of construction.
Figure 3:
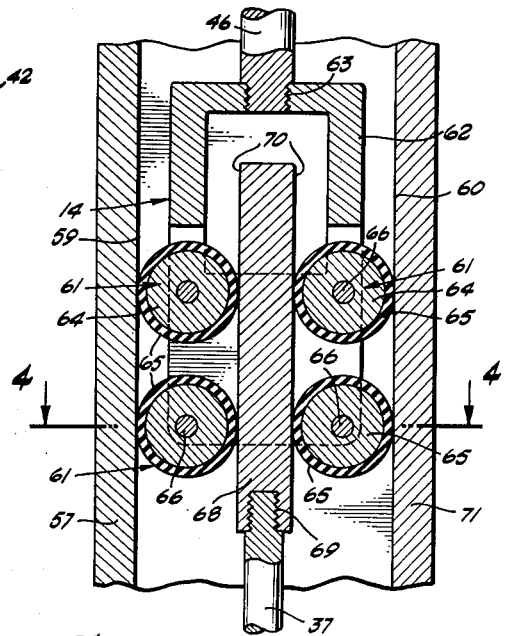
Figure 3 is an enlarged sectional view showing the operating parts of the stroke multiplier device.
Figure 4:
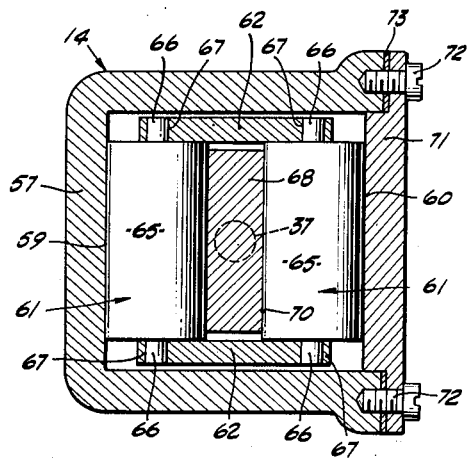
Figure 4 is a sectional plan view taken substantially on the lines 4—4 as viewed in Figure 3.
Figure 5:
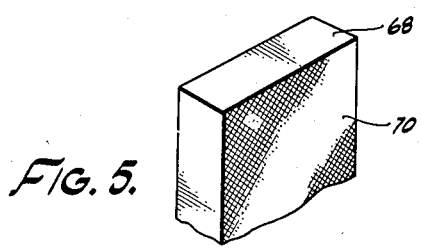
Figure 5 is a perspective view, partly broken away, showing the upper end of the driven member.

Referring to the drawings, the control valve assembly generally designated 10 is interposed between a supply line 11 and a controlled pressure line 12. A power head assembly 13 is connected through the stroke multiplying device 14 to operate a movable valve part 15 within the control valve assembly 10. A control pipe 16 is connected to the power head 13 and to the supply line 11 upstream from the valve assembly 10. A by-pass line 17 is connected to the supply line 11 at 18 and is connected to the controlled pressure line 12 at 19. The by-pass line 17 includes a shutoff valve 20. Other shutoff valves 21 and 22 are provided in the supply line 11 and controlled pressure line 12, respectively. In the normal operation of the device, the shutoff valve 20 remains closed and the valves 21 and 22 normally remain open.

As shown in Figure 2, the control valve assembly 10 may be provided with a pair of axially spaced valve seats 23 and 24 for cooperation with the sealing faces 25 and 26, respectively, on the valve element 15. This valve element 15 is provided with integral guide parts 27 and 28 which are slidably received within guide bushings 29 and 30, respectively. The bushing 29 is carried on the valve bonnet 31 and the bushing 30 is carried on the closure 32. The construction just described constitutes a balanced valve assembly. When the sealing faces 25 and 26 engage the valve seats 23 and 24, respectively, the valve is closed and no flow occurs. When the valve 15 is in the position shown in Figure 2, fluid flows through the inlet 33, through the seats 23 and 24, into the space 34 and out through the outlet 35. The curved shape of the outer surfaces 36 of the valve element 15 is proportioned to achieve optimum flow regulating characteristics for any given position of the valve member 15.

A valve stem 37 fixed to the valve member 15 extends through a stuffing box assembly 38. This stuffing box assembly may be provided with a pressure fitting 39 for introducing lubricant into the stuffing box under pressure.

The power head 13 includes a pair of upper and lower metallic dished members 40 and 41 connected by threaded fastenings 42. The members 40 and 41 serve to clamp a flexible diaphragm 43 therebetween along its outer periphery. The diaphragm 43 and upper member 40 cooperate to define a pressure chamber 44. An inlet fitting 45 connected to the control pipe 16 serves to introduce fluid under pressure into the chamber 44.

A diaphragm stem 46 has a flange 47 fixed to its upper end, which engages a major portion of the lower surface of the diaphragm 43. This stem 46 extends through a bushing 48 which in turn slides within a guide opening 49 provided in the lower dished member 41. A spring housing 50 encircles a portion of the stem 46 and provides an enclosure for the compression springs 51. The upper ends of these springs 51 engage the annular washer 52 and the lower ends engage the annular washer 53. The lower washer 53 rests on a bearing assembly 54 which is supported on an adjusting nut 55. The nut 55 carries a bushing 56 for sliding engagement with the stem 46.

In accordance with my invention I provide a stroke multiplying device 14 operatively positioned between the power head 13 and the control valve assembly 10. As shown in Figures 2–5, this stroke multiplying device includes a frame or body 57 which connects the spring housing 50 with the valve bonnet 31. The upper end of the body 57 may be formed integrally with the spring housing 50 and the lower end connected to the valve bonnet 31 by means of the nut 58.

The body 57 is provided with axially extending parallel surfaces 59 and 60. A plurality of rollers 61 is provided and each of the rollers engages one of the surfaces 59 or 60. The rollers are each rotatably supported on a traveling cage 62 which is fixed to the stem 46 by any convenient means such as, for example, by means of the threads 63. Each of the rollers 61 comprises a central nonresilient cylindrical part 64 provided with an annular resilient facing 65. The facing is preferably formed of rubber bonded to the cylindrical member 64. A metallic pin 66 extends axially through each of the cylindrical parts 64 and is fixed thereto. The pins 66 project at their opposite ends to act as trunnions and the projecting portions are received in bearings 67 provided on the cage 62.

A central plate 68, which constitutes a driven member, is fixed to the upper end of the stem 37 by any convenient means, for example, by means of the threads 69. This plate 68 is also engaged by the rollers 61. The surfaces 70 of the plate 68 as well as the surfaces 59 and 60 of the body 57 are preferably serrated or scored to provide a nonslip surface for engagement with the rollers 61.

From this description, it will be understood that downward movement of the cage 62 causes the rollers 61 to move the plate 68 in the same direction but with twice the stroke. Thus, as the cage moves downward for a distance of one inch, the axes of the rollers 61 move downward one inch but the plate 68 is moved downward two inches. When the cage 62 is raised, the plate 68 is also raised but travels twice the distance.

Means are provided for varying the lateral squeezing pressure applied to the rollers in order that the friction contact between the rollers and the surfaces 59, 60 and 70 shall be great enough to transmit the required forces but not great enough to damage the rubber parts 65 by excessive distortion. As shown in the drawings, this means includes the removable section 71 of the body 57. This section 71 is secured to the body by means of the threaded fastenings 72. The spacing between the surfaces 59 and 60 is determined by the number of shims 73. In order to increase the lateral squeezing pressure on the rollers 61, it is only necessary to remove one or more shims 73.

In the modified form of my invention shown in Figures 6 and 7, any desired ratio of movement between the power stem and valve stem may be achieved. This is accomplished by employing rollers having more than one effective diameter. Thus, the rollers 74 are each provided with a central large diameter portion 75 and concentric small diameter portions 76. The large diameter portions 75 engage the surfaces 77 of the plate 78 while the small diameter portions 76 engage the surfaces 79 and 80, respectively. The surfaces 79 are formed on the body 81 and the surfaces 80 are formed on the removable body section 82. The construction of the rollers and mounting on the cage 83 is substantially the same as previously described. The power stem 46a is connected to the cage 83 and the valve stem 37a is connected to the plate 78. Adjustment of the squeezing applied to the valve rubber surfaces of the rollers 74 is accomplished by means of the shims 84.

The ratio of movement of the power stem 46a to the movement of the valve stem 37a is determined by the relative sizes of the large and small portions of the rollers 74. Thus, if the large portions 75 of the rollers are twice as large in diameter as the small portions 76, the stroke of the valve stem 37a will be four times the stroke of the power stem 46a. It is contemplated that the surfaces 77, 79 and 80 will be serrated or scored for good frictional contact with the rubber surfaces of the rollers 74, as previously described.

In operation fluid under pressure is carried in the supply pipe 11 and delivered to the control valve assembly 10. The pressure of the fluid is reflected through the control pipe 16 and is applied to the pressure chamber 44 within the power head 13. This pressure in chamber 44 tends to move the diaphragm 43 downward and this motion is resisted by the compression springs 51. An increase in pressure in the supply line 11 is reflected by an increase of force supplied to the diaphragm 43 with the result that the stem 46 moves downward against the action of the spring 51. The downward motion of the stem 46 is multiplied by means of the mechanism 14 with the result that the valve stem 47 is caused to move through a greater distance. If the stroke multiplying device of Figures 2–5 is employed, the valve stem moves twice the amount of movement of the power stem 46. If the stroke multiplier device shown in Figures 6 or 7 is employed, the movement of the valve stem is greater and the amount of movement depends upon the ratio of diameters of the rollers 74, as previously described. When the pressure in the supply line 11 falls, the force on the diaphragm 43 is reduced and the springs 51 raise the stem 46. The stroke multiplying device 14 then raises the valve stem 37 and the valve stem 37 moves through a greater distance.

Very accurate pressure regulation is achieved because small increments of movement of the power stem 46 reflect greater increments of movement of the valve member 15. A long stroke for the valve member 15 is thus achieved even though only a relatively short stroke may be available for the power stem 46.

Having fully described my invention, it is to be understood that I do not wish to be limited to the details herein set forth but my invention is of the full scope of the appended claims.

I claim:

1. In a stroke multiplier for a power operated valve assembly, the combination of: a stationary body having parallel axially extending surfaces, a movable cage within the body having a pair of laterally spaced rubber rollers, each of the rollers engaging one of said surfaces, a driven member extending into the body between said rollers and in engagement therewith, means for adjusting the lateral spacing of said surfaces to vary the squeezing pressure on said rollers, whereby movement of the cage acts to cause the rollers to effect greater movement of the driven member in the same direction.

2. In a stroke multiplier for a power operated valve assembly, the combination of: a stationary body having parallel axially extending surfaces, a movable cage within the body having a plurality of pairs of laterally spaced rollers, each of the rollers resiliently engaging one of said surfaces, a driven member extending into the body between pairs of said rollers and in engagement therewith, means for adjusting the lateral spacing of said surfaces to vary the squeezing pressure on said rollers, whereby movement of the cage acts to cause the rollers to effect greater movement of the driven member in the same direction.

3. In a stroke multiplier for a power operated valve assembly, the combination of: a stationary body having a laterally removable section, parallel axially spaced roughened surfaces on the body and removable section, a movable cage within the body having a plurality of laterally spaced rubber faced rollers, each engaging one of said roughened surfaces, and a driven member extending into the body between said rollers, the driven member having parallel surfaces in engagement with said rollers, shims interposed between the body and said removable section for varying the lateral spacing of said roughened surfaces, whereby movement of the cage acts to cause the rollers to effect greater movement of the driven member in the same direction.

4. In a stroke multiplier for a power operated valve assembly, the combination of: a stationary body having parallel axially extending surfaces, a movable cage within the body having a pair of laterally spaced rollers mounted thereon, each of the rollers having a small diameter portion engaging one of said surfaces, and a driven member extending into the body between said rollers, each of the rollers having a large diameter portion engaging said driven member.

References Cited in the file of this patent

UNITED STATES PATENTS

| | | |
|---|---|---|
| 1,512,647 | Stevens | Oct. 21, 1924 |
| 1,579,975 | Tunison | Apr. 6, 1926 |
| 1,640,655 | Hartman | Aug. 30, 1927 |
| 1,805,802 | Browne | May 19, 1931 |
| 1,938,781 | Nenninger | Dec. 12, 1933 |
| 2,502,057 | Mitchell | Mar. 28, 1950 |

FOREIGN PATENTS

| | | |
|---|---|---|
| 581,932 | France | Oct. 6, 1924 |
| 491,826 | Germany | Feb. 20, 1930 |